United States Patent [19]

Volk, Jr.

[11] 3,996,496

[45] Dec. 7, 1976

[54] GROUND INTEGRITY MONITOR FOR ELECTRICAL APPARATUS

[75] Inventor: Joseph A. Volk, Jr., Florissant, Mo.
[73] Assignee: Borg-Warner Corporation, Chicago, Ill.
[22] Filed: Nov. 25, 1974
[21] Appl. No.: 526,983
[52] U.S. Cl. .................. 317/18 B; 317/18 A; 317/18 C; 317/10; 340/256; 324/51
[51] Int. Cl.² .................................. H02H 3/00
[58] Field of Search ........... 317/18 B, 18 A, 18 C, 317/18 R, 18 D, 9 A, 10; 340/256, 248 N; 324/51

[56] References Cited
UNITED STATES PATENTS

| | | | |
|---|---|---|---|
| 2,999,189 | 9/1961 | Gerrard | 317/18 B |
| 3,176,219 | 3/1965 | Behr | 324/51 |
| 3,402,326 | 9/1968 | Guasco et al. | 317/18 B |
| 3,496,416 | 2/1970 | Agnew | 317/18 C |
| 3,641,547 | 2/1972 | Reiss et al. | 340/256 X |
| 3,697,808 | 10/1972 | Lee | 317/18 A |
| 3,708,721 | 1/1973 | Marcade et al. | 317/18 B |
| 3,766,434 | 10/1973 | Sherman | 317/18 A |
| 3,810,003 | 5/1974 | Portoulas | 324/51 |
| 3,840,782 | 10/1974 | Monaghan | 340/256 |

*Primary Examiner*—R. Skudy
*Assistant Examiner*—Patrick R. Salce
*Attorney, Agent, or Firm*—James E. Tracy

[57] ABSTRACT

The ground and neutral terminals of a three-wire grounded AC power source for electrical apparatus, such as the control system of a motor operated hospital bed, are both normally connected to earth ground. The integrity or continuity of the ground connection is constantly monitored by applying, between the neutral and ground terminals, sharp narrow pulses periodically recurring at a relatively low pulse repetition frequency. When the resistance in the neutral/ground circuit is less than a predetermined threshold level, the pulsing causes an LED photo coupler to flash and this in turn produces a control signal for maintaining the electrical apparatus coupled to the AC power source. When the resistance between the neutral and ground terminals exceeds the threshold level, the AC power supplied to the apparatus is interrupted.

1 Claim, 1 Drawing Figure

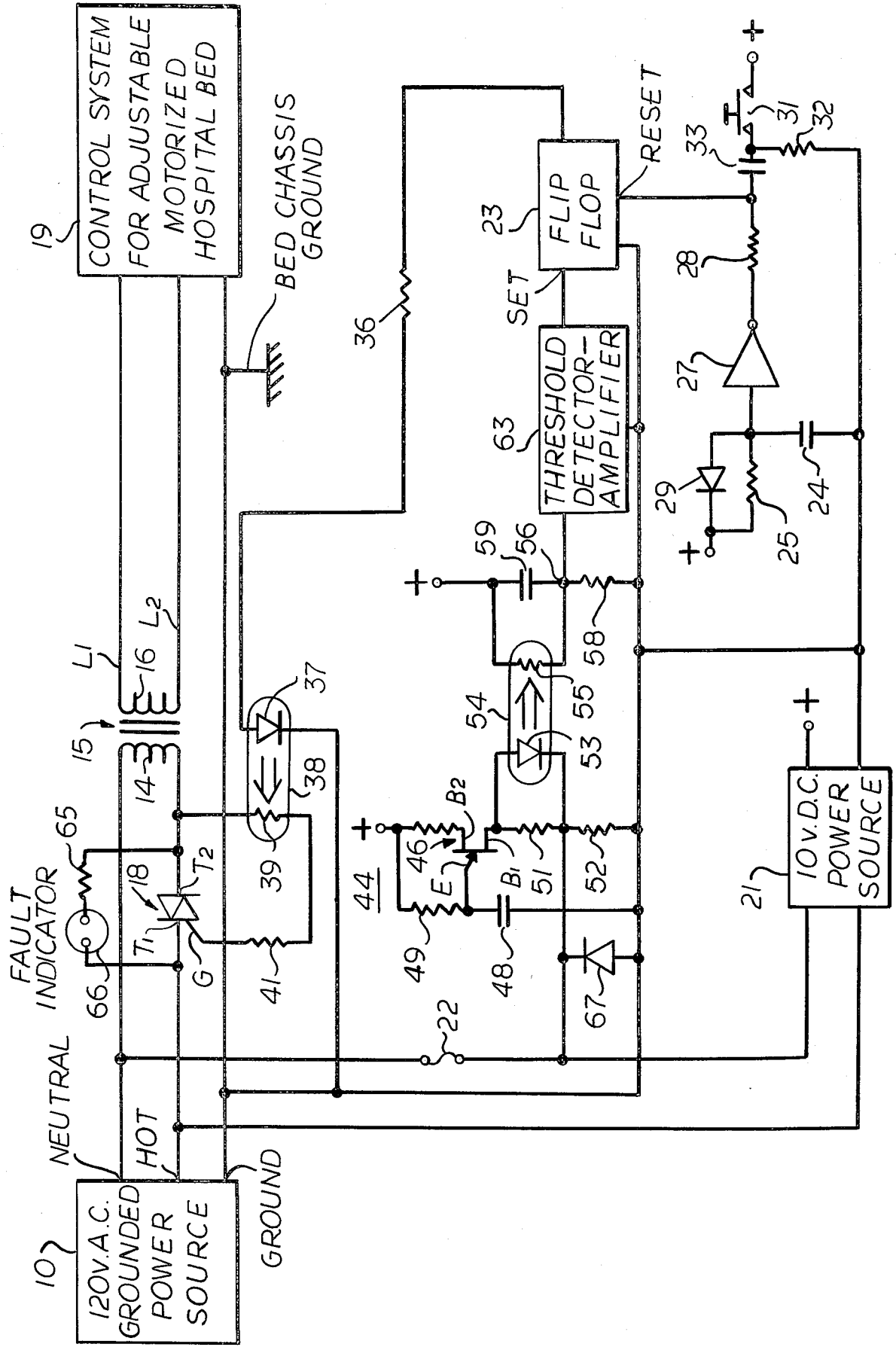

GROUND INTEGRITY MONITOR FOR ELECTRICAL APPARATUS

BACKGROUND OF THE INVENTION

This invention relates generally to a protection circuit for electrical apparatus and particularly to a monitoring system for determining if the ground terminal of a three-wire grounded AC power source for the electrical apparatus is in fact properly grounded. While the invention may be employed with any electrical apparatus or equipment having a grounded chassis, it is especially attractive when used with an adjustable motorized hospital bed and will be described in that environment.

A motor operated hospital bed, the positioning of which may be remotely controlled by means of an electrical control system operated by the patient, must be completely safe to preclude any possibility of the patient being subject to hazardous electrical shocks from the voltages present in the control system or in the conductors supplying AC power thereto. To that end, and in accordance with the conventional practice, the metal bed frame or chasis is usually connected to the ground terminal of the three-wire AC power source in order that the bed chassis will be tied to earth ground. In this way, circuit component failures or insulation breakdowns cannot establish the bed frame at a dangerously high potential relative to earth ground. Of course, maintaining a patient immune to or protected against malfunctioning or faults, that tend to cause the application of undesired voltages to the bed chassis, requires that the bed frame remain properly grounded at all times and this means that the ground terminal of the grounded AC power source must remain connected to earth ground via a low-resistance connection.

Monitoring circuits have been developed for testing or checking the integrity of the ground connection at the ground terminal, but these prior arrangements have many shortcomings and disadvantages, particularly when employed with hospital beds. For example, in some of the ground integrity monitors developed heretofore, RF (radio frequency) signals are used to sense the quality of the ground connection, but this method is not always accurate since the presence of any inductance may falsely indicate a bad ground connection when in fact it may be a good connection. Moreover, the hospital bed may contain leakage monitoring equipment to detect undesired leakage currents, and that equipment may be falsely operated by the RF signals. In addition, the RF energy is likely to deleteriously affect some of the other electrical equipment in the hospital where the bed is located. Other ground testers effectively function like ohmmeters but they usually connot detect very low resistances, such as less than three ohms, which is the value desired in a good ground connection. Besides, any noise signals present will affect the operation of an ohmmeter-type ground integrity monitor and lead to erroneous results.

The ground integrity monitor of the present invention constitutes a significant improvement over those developed heretofore, since it is, inter alia, of relatively inexpensive construction, requires very little power, provides accurate results, is capable of detecting very low resistance ground connections, does not employ RF signals, is noise immune, and will not affect the operation of other equipment.

SUMMARY OF THE INVENTION

The ground integrity monitor of the invention is to be incorporated in electrical apparatus, such as an adjustable motorized hospital bed, wherein a single phase, three-wire grounded AC power source having hot, neutral and ground terminals is coupled to the electrical apparatus for applying AC operating voltage thereto, wherein both the neutral and ground terminals are ordinarily connected to earth ground, and wherein a conductive chassis of the electrical apparatus is connected to the ground terminal. A pulse signal generator produces sharp narrow pulses periodically recurring at a pulse repetition frequency very low relative to the commutating frequency of the AC power source. Means are provided for applying the pulses between the neutral and ground terminals of the AC power source. There are means responsive to the pulsing of the neutral/ground circuit for producing a control signal effectively representing the resistance between the neutral and ground terminals. Switching means controlled by the control signal decouples the electrical apparatus from the AC power source when the resistance between the neutral and ground terminals exceeds a predetermined threshold level.

DESCRIPTION OF THE DRAWING

The features of the invention which are believed to be novel are set forth with particularity in the appended claims. The invention, together with further advantages and features thereof, may best be understood, however, by reference to the following description in conjunction with the accompanying drawing which schematically illustrates a ground integrity monitor, constructed in accordance with the invention, and the manner in which the monitor is incorporated in the electrical system of an adjustable motorized hospital bed.

DESCRIPTION OF THE ILLUSTRATED EMBODIMENT

Block 10 represents a conventional three-wire grounded AC power supply or source providing a single-phase alternating voltage having a magnitude of approximately 120 volts RMS and a commutating frequency of 60 cycles per second or hertz. This AC voltage, or what is commonly called line voltage, is usually available at a grounded wall outlet in any hospital room where an adjustable hospital bed is located. The line voltage is produced across the terminals of power source 10 labeled "Hot" and "Neutral". The third terminal of power source 10 is connected to the building ground or earth ground, as is also the case with the neutral terminal. The voltage at the hot terminal alternates in generally sinusoidal fashion above (or positive) and below (or negative) relative to the earth ground reference plane. In a manner to be explained, the ground integrity monitor senses the resistance between the hot and neutral terminals to ascertain whether a good ground connection exists.

Under normal conditions, the line voltage is applied to the primary winding 14 of an isolation transformer 15 through a series-connected bidirectional semiconductor or solid state switching device 18 which preferably takes the form of a triac having first and second main terminals, labeled $T_1$ and $T_2$ repectively, and a control or gate terminal G. A triac may be considered as two parallel PNPN structures oriented in opposite directions to provide symmetrical bidirectional electrical characteristics to permit current flow between the main terminals in either direction. It operates basically as two silicon controlled rectifiers or SCR's connected in parallel, but with the anode and cathode of one SCR connected to the cathode and anode, respectively, of the other SCR. In the absence of any applied voltages a triac assumes its OFF condition in which a very high impedance exists between main terminals $T_1$ and $T_2$ to effectively constitute an open switch. When a voltage of either polarity is impressed across the main terminals at the same time that triggering or gate current of appropriate magnitude flows between terminals G and $T_1$ in either direction, the triac turns ON to permit current flow between terminals $T_1$ and $T_2$ in response to the voltage applied thereto and in the direction determined by the voltage's polarity. When the triac conducts, a very low impedance is presented between its main terminals so that it essentially functions as a closed switch.

Isolation transformer 15, while not essential to the operation of the present invention, isolates the bed's electrical control system from the AC voltage supplied over the neutral and hot conductors. Of course, it provides no isolation with respect to any voltage that the patient may encounter from some external electrical apparatus also powered by power source 10, which usually will be common to all the electrical equipment in the hospital room. Inasmuch as transformer 15 merely serves to isolate the bed's electrical system from power source 10, it preferably has a 1:1 turns ratio. The terminals of secondary winding 16 connect over respective ones of line conductors $L_1$ and $L_2$ to the electrical control system for the adjustable motorized hospital bed, depicted in the drawing by the single block labeled 19. The metal bed chassis or frame, which of course is conductive, is connected to the ground terminal of power source 10. Under normal operating conditions when both the neutral and ground terminals of source 10 are properly connected to earth ground, the line voltage of 120 volts is appled, via transformer 15, to control system 19 to effect energization thereof in order that the positioning of the hospital bed may be under control of the patient occupying the bed.

In a typical arrangement, the control system includes a motor-drive system and a push button-actuated control device capable of remotely controlling the motor-drive system. By selectively depressing the push buttons, the patient is able to control the various adjustments. Usually, the mattress-supporting structure of the bed is articulated, being divided into four interconnected sections or panels, namely a back section, a center or seat section, an upper knee or thigh section, and a lower knee or foot section. One motor-driven adjustment that may be controlled by the patient raises or lowers the two knee sections where they join together, thereby controlling the position of the patient's knees. Another adjustment, under the patient's control, pivots or tilts the back section with respect to the center section so that the patient's back and head may be raised or lowered. In most cases, a third motor-driven adjustment may be controlled by the push button-actuated control device to vertically adjust the entire mattress-supporting frame.

As one example of a construction that control system 19 may take, reference is made to copending patent application Ser. No. 380,310, filed July 18, 1973 in the name of Kenneth W. Padgitt and issued on Nov. 18, 1975 as U.S. Pat. No. 3,921,048. In that application, optically coupled circuits are employed to electrically isolate the patient's hand control unit from the much higher current motor-drive circuitry.

A DC power source 21 is coupled, via fuse 22, to the neutral and hot terminals of AC power source 10 in order to produce a DC voltage, preferably around 10 volts, for operating the ground integrity monitor. Of course, all of the terminals in the drawing marked + are tied to the positive output of DC source 21. A bistable device, such as a bistable multivibrator or flip flop 23, controls triac 18. Flip flop 23 has two stable operating conditions, designated for convenience as the set and reset conditions respectively. Once the flip flop is triggered to its reset condition by means of a triggering pulse applied over its reset input, the flip flop will remain in that condition subsequent to the termination of that pulse and until another triggering pulse is applied over its set input, whereupon it will be actuated to its set condition, where it will remain until reset.

A reset circuit automatically resets the flip flop when power source 21 becomes energized. At that time, capacitor 24 charges through resistor 25 toward the ten volts positive potential of DC source 21. The positive-going voltage at the junction of capacitor 24 and resistor 25 is threshold detected in amplifier 27 to produce a suitable reset pulse which is applied via resistor 28 to the reset input of flip flop 23. Diode 29 provides a discharge path for capacitor 24 when power is removed from the circuit. For reasons to be appreciated, a manual reset is also provided for flip flop 23. Manually operated reset switch 31 is a normally-open push button momentary contact switch. By depressing switch 31, the positive voltage of DC source 21 is applied to the differentiating circuit formed by resistor 32 and capacitor 33 which in turn produces a triggering pulse for resetting the flip flop.

The single output of flip flop 23 produces a rectangular wave signal which varies between positive and zero amplitude levels, relative the earth ground reference plane, as the flip flop is actuated between its reset and set conditions. Specifically, the output voltage of the flip flop will be positive when in its reset condition, and zero when in its set condition.

When flip flop 23 is actuated to its reset condition, the positive output voltage is applied via current limiting resistor 36 to the anode of the light emitting diode 37 of an LED photo coupler or opto isolator 38, the cathode of the diode being connected to the ground terminal of AC power source 10. Diode 37 illuminates and this in turn causes the photo resistor 39 of LED photo coupler 38 to exhibit a resistance sufficiently low to permit gate current to flow through resistor 41 and between the gate and main terminal $T_1$ of triac 18, as a result of which the triac turns ON and completes the coupling between AC power source 10 and primary 14 so that power is supplied to the electrical control system 19. Hence, under normal conditions flip flop 23 will be established in its reset condition and this in turn results in triac 18 being in its ON state so that the AC power supply will be coupled to control system 19.

It will now be shown that in the event of an improper ground connection in AC power source 10, flip flop 23 is triggered to its set condition to disconnect the power source from control system 19. This is achieved by pulsing the neutral/ground circuit in power source 10. If the resistance in that circuit is very low, such as less than three ohms which would be the case when a proper ground connection exists, the pulsing results in flip flop 23 remaining in its reset condition. On the other hand, when the neutral/ground resistance is greater than three ohms, the pulsing causes the flip flop to assume its set condition, thereby effecting a decoupling of control system 19 from power source 10.

More specifically, periodically recurring, sharp narrow pulses are produced by a free-running relaxation oscillator, preferably taking the form of a conventional unijunction oscillator 44. It includes a unijunction transistor 46 having two bases $B_1$ and $B_2$ and an emitter E. In operation of oscillator 44, capacitor 48 charges through resistor 49 until the positive-going voltage applied to the emitter reaches the voltage level at which transistor 46 turns ON and dishcarges capacitor 48 through the series-connected resistors 51 and 52. The capacitor dischages to a level at which the emitter ceases to conduct, transistor 46 thereupon turning OFF to initiate another cycle. Preferably, the parameters of oscillator 44 are selected so that the sharp pulses developed across resistors 51 and 52 recur at a pulse repetition frequency around eight cycles per second or hertz, which frequency is very low relative to the commutating frequency (60 hertz) of the AC power source 10.

Since the neutral/ground circuit is connected, via fuse 22, in shunt with resistor 52, the pulses produced by the unijunction oscillator will be applied between the neutral and ground terminals of AC power source 10. If there is a good connection between the ground terminal and earth ground, the resistance between the neutral and ground terminals will be less than three ohms. Under those conditions, resistor 52 (which preferably has a resistance of approximately 47 ohms) will be practially shorted by the neutral/ground circuit. As a consequence, each time a pulse is produced between base one and ground most of the voltage is dropped across resistor 51 which preferably has a resistance around four ohms. This voltage will be sufficient to illuminate the light emitting diode 53 in the LED photo coupler 54. The photo resistor 55 responds to the flashing of diode 53 and exhibits a relatively low resistance. Of course, the diode will not illuminate constantly but flashes at the rate of eight times a second. However, photo resistor 55 has a certain amount of hysteresis so that its resistance remains substantially constant even though the diode illuminates intermittently. With a relatively low resistance presented by photo resistor 55, a positive voltage of relatively high amplitude will be provided at junction 56. Threshold detector-amplifier 63 is constructed so that it will not respond to the high amplitude input. Thus, no triggering signal will be applied over the set input of flip flop 23 at that time, and it will remain in its reset condition so long as a good ground connection is established in AC power source 10.

If some transient or noise condition prevents diode 53 from flashing, the voltage at junction 56, which effectively constitutes a control signal representing the resistance between the neutral and ground terminals of source 10, will remain at a relatively high amplitude. This is due to the integrating nature of photo resistor 55 and capacitor 59 which necessitates that diode 53 be extinguished for a few second before the amplitude of the control signal at junction 56 can decrease to a level at which threshold detector-amplifier 63 responds. As a result, the ground integrity monitor of the invention is noise immune.

Assume now that the connection from the ground terminal of source 10 to earth ground opens or becomes resistive, having a resistance over three ohms. The voltage drop across resistor 52 each time the oscillator pulses will now be sufficiently high that insufficient voltage develops across resistor 51 to illuminate diode 53. In the absence of flashing, photo resistor 55 slowly increases its resistance, as a consequence of which the positive voltage at junction 56 decreases to a level at which threshold detector-amplifier 63 responds to produce an actuating signal over the set input of flip flop 23. Flip flop 23, therefore, sets and its output potential becomes zero with respect to the ground reference plane. Light emitting diode 37 extinguishes and photo resistor 39 thereupon introduces a resistance in the gate circuit for triac 18 sufficiently high to render the triac non-conductive. Primary winding 14 thus becomes disconnected from power supply 10. When triac 18 is switched OFF, the full 120 volts is applied to the fault indicator circuit comprising the lamp 66 (which may be a neon bulb) and current limiting resistor 65. The lamp illuminates at this time to provide a visual signal that a malfunction exists in the ground circuit. When the troublesome connection is repaired so that ground integrity is restored, reset switch 31 may be depressed to reset the flip flop and re-establish the application of line voltage to primary winding 14.

Diode 67 and fuse 22, which are in the neutral/ground circuit, provide protection in the event that the conductors connected to the neutral and hot terminals of AC power source 10 become reversed, which of course would occur if the plug of the power cord for the hospital bed were inserted in the wall outlet backwards. In addition, diode 67 and fuse 22 protect the monitoring system if the building is wired in reverse such that the hot and neutral outputs of the wall outlet (power source 10) are reversed. Under either of those conditions, the 120 volts AC line voltage will be applied through fuse 22 and across diode 67 and resistor 52. The fuse quickly blows since the diode conducts during alternate half cycles. During the intervening half cycles, current flows through resistor 52 to prevent damage to transistor 46.

While LED photo coupler 54 is coupled across resistor 51, it could be coupled in shunt with resistor 52, thereby flashing when the ground connection is interrupted or broken. With this variation of the invention, the parallel combination of capacitor 59 and photo resistor 55 would have to be reversed with resistor 58. The illustrated arrangement (LED coupler 54 flashing only when there is a good ground connection) is preferred since it provides a fail safe feature. If for some reason LED photo coupler 54 malfunctions and cannot operate, flip flop 23 will automatically be triggered to its set condition to cut off the power supplied to the hospital bed.

While a triac is preferred for interrupting the hot line when there is a poor ground connection, a wide variety of switching devices could be used instead. For example, a relay could be employed. On the other hand, an LED photo coupler may be used.

The invention provides, therefore, a novel hospital bed protection circuit for dynamically monitoring the ground integrity of a grounded AC power supply for the bed and for disconnecting the power supply from the bed anytime ground integrity is absent.

While a particular embodiment of the invention has been shown and described, modifications may be made, and it is intended in the appended claims to cover all such modifications as may fall within the true spirit and scope of the invention.

I claim:

1. A ground integrity monitor for electrical apparatus wherein a single phase, three-wire grounded AC power source having hot, neutral and ground terminals is coupled to the electrical apparatus for applying AC operating voltage thereto, wherein both the neutral and ground terminals are ordinarily connected to earth ground, and wherein a conductive chassis of the electrical apparatus is connected to the ground terminal, comprising:

a pulse signal generator including a unijunction oscillator having a unijunction transistor whose base-one is connected to the ground terminal through, in the order named, first and second series resistors, said generator producing, across said resistors, sharp narrow pulses periodically recurring at a pulse repetition frequency very low relative to the commutating frequency of the AC power source;

means for connecting the neutral/ground circuit in shunt with said second resistor to apply said pulses between the neutral and groud terminals of the AC power source;

control signal producing means responsive to the pulsing of the neutral/ground circuit for producing a control signal effectively representing the resistance between the neutral and ground terminals, said control signal producing means including a light emitting diode photo coupler whose light emitting diode is connected in shunt with said first resistor and flashes when the resistance in the neutral/ground circuit is below a predetermined threshold level, thereby causing the photo resistor of said coupler to exhibit a relatively low resistance, the amplitude of said control signal being determined by the resistance of said photo resistor;

and an integrating device, included in said control signal producing means, for rendering the monitor immune to transients that may otherwise deleteriously affect its operation.

* * * * *